July 21, 1936.    E. S. HINELINE    2,048,655
MEANS FOR DETERMINING THE EXACT LIGHT EXPOSURE
IN CAMERAS WHILE FOCUSING THE SAME
Filed June 11, 1935    4 Sheets-Sheet 1

Inventor:
Edson S. Hineline,

July 21, 1936.   E. S. HINELINE   2,048,655
MEANS FOR DETERMINING THE EXACT LIGHT EXPOSURE
IN CAMERAS WHILE FOCUSING THE SAME
Filed June 11, 1935    4 Sheets-Sheet 2
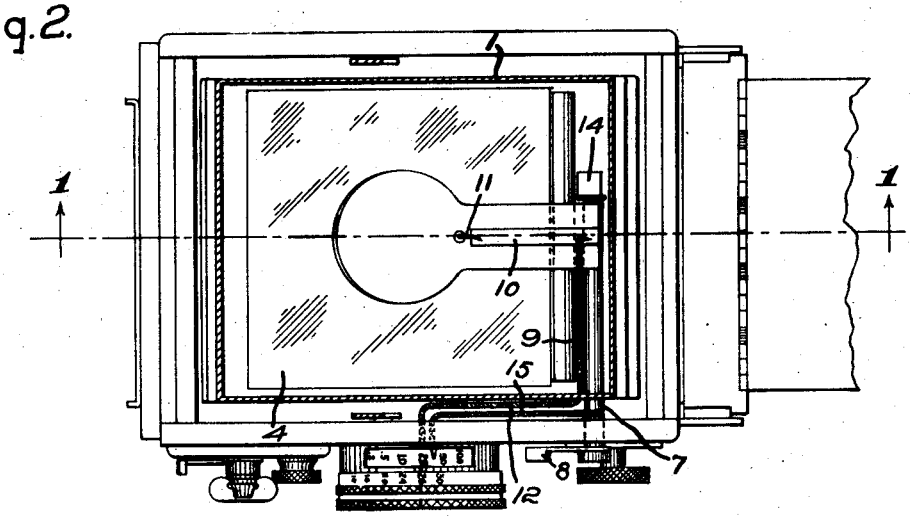
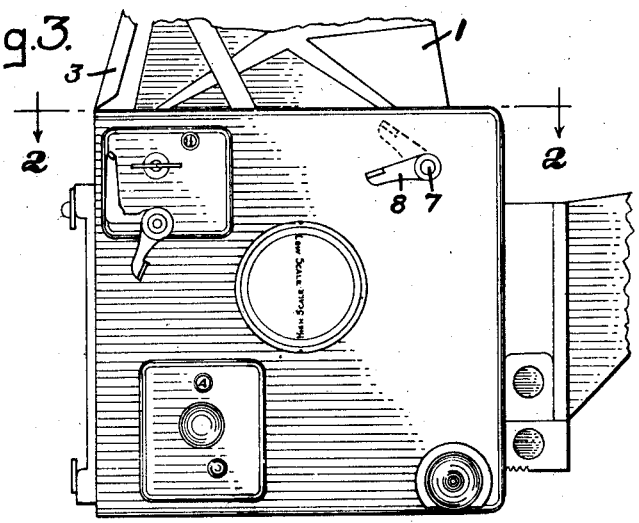
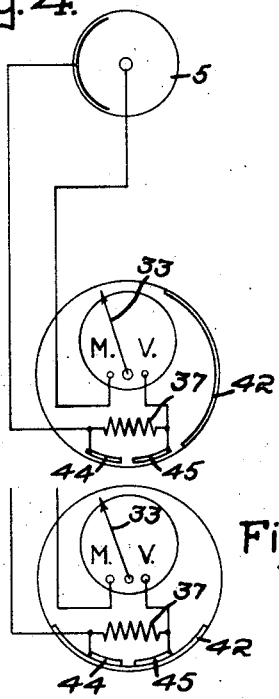
Inventor:
Edson S. Hineline,
Attys July 21, 1936.　　　　E. S. HINELINE　　　　2,048,655
MEANS FOR DETERMINING THE EXACT LIGHT EXPOSURE
IN CAMERAS WHILE FOCUSING THE SAME
Filed June 11, 1935　　　　4 Sheets-Sheet 3

Inventor:
Edson S. Hineline,
Attys

Patented July 21, 1936

2,048,655

UNITED STATES PATENT OFFICE 2,048,655

MEANS FOR DETERMINING THE EXACT LIGHT-EXPOSURE IN CAMERAS WHILE FOCUSING THE SAME

Edson S. Hineline, Rochester, N. Y., assignor to The Folmer Graflex Corporation, Rochester, N. Y., a corporation of Delaware Application June 11, 1935, Serial No. 26,012

16 Claims. (Cl. 88—23)

This invention relates to improvements particularly applicable to the reflecting type of camera, but as to certain features thereof are of more general application.

It has long been the desire of the users of the reflecting type of camera to have a means of determining the exact light-exposure or light-value while making other adjustments (that is, for instance, focusing). It is the aim of this invention to provide this in such a manner that in no way is the operation of the camera changed from the conventional method. At the same time, the present invention provides a means of measuring the light as it actually falls on the ground glass focusing screen, which screen bears the same relation, so far as focal distance is concerned, as does the sensitized material used for making photographs.

It will be noted that the light to be measured comes through the objective that is also used for making the exposure and this light is diffused through the ground glass or viewing screen. Therefore, this gives a more uniform result, as the reading will be an average one rather than of a particular point of light. In making photographs, there is a varying light condition over the exposure area. It almost always is necessary to make an exposure based on the average light rather than the light falling on one particular section.

It is a further purpose of this invention to make the device readily operable and to have it at all times ready for use. Other purposes of the invention will be set forth in the following description.

In order that the principle of the invention may be readily understood, I have disclosed a single embodiment thereof in the accompanying drawings, wherein—

Fig. 2 is a top elevation with the hood removed or cut on the section line 2—2 of Fig. 3;

Fig. 3 is a side elevation showing the operating lever and also the meter on the side of the camera case;

Fig. 4 is a circuit diagram showing the various connections when using the low scale;

Fig. 5 is a second circuit diagram showing the contacts in short circuiting position;

Figure 1:
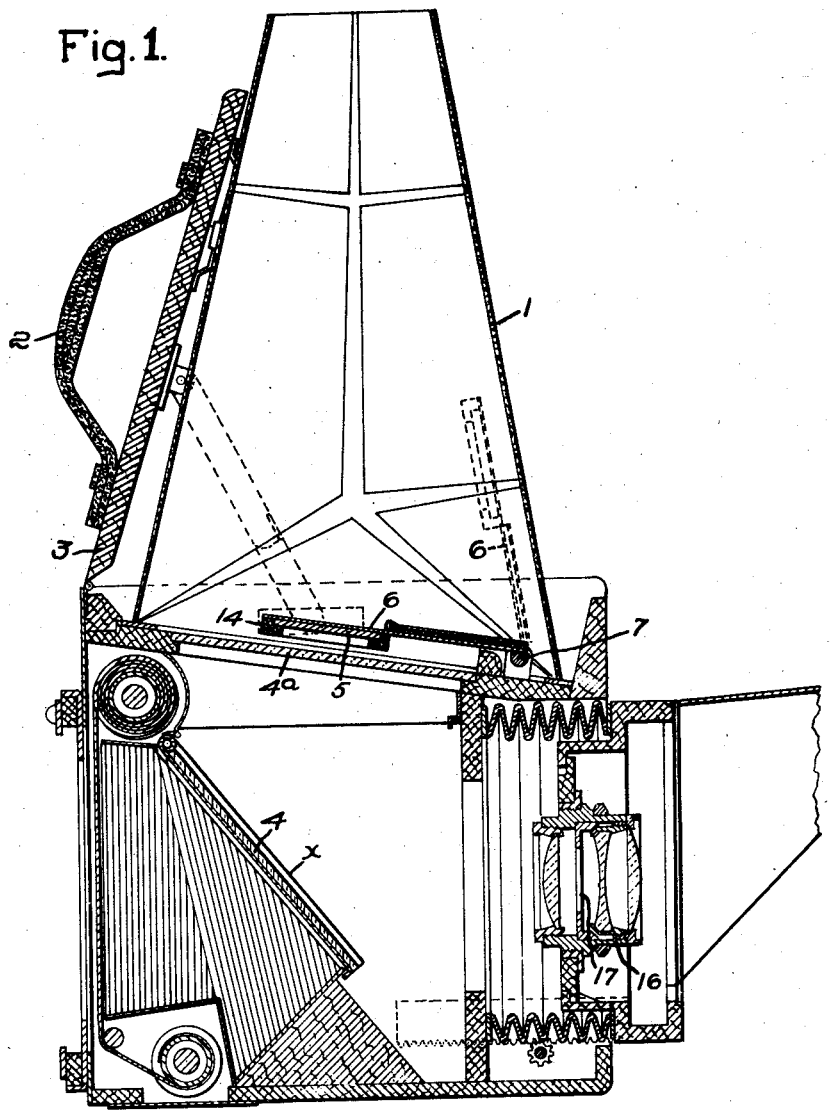
Fig. 1 is a vertical cross section through the camera on the line 1—1 of Fig. 2.

Referring to the single embodiment of the invention herein disclosed, Fig. 1 is a cross section of a reflex camera showing the location of the various elements that are used to obtain a reading of the light value coming through the lens, this light being used to make a photograph. A focusing hood that is regularly furnished on this type of camera to exclude light from the top side of the focusing screen is shown at 1, and at 2 is a handle on cover 3, used for both carrying the camera and supporting the camera when pictures are being made. The mirror 4 is used for reflecting light from the lens to the ground glass focusing screen 4a. A photo-electric cell of the photonic type is indicated at 5, and may itself be in character like photo-electric cells now on the market, and therefore requiring no detailed description, since, so far as the cell itself is concerned, it may be of usual construction. It is not claimed herein per se, but it is used in a new manner or relation. The photo-electric cell of any desired type is mounted on the camera at the ground glass or viewing screen so that the light passing through the lens and reflected by the mirror onto the viewing screen is measured as to its intensity by the said cell where the light is diffused at the said ground glass or viewing screen. Preferably, and for convenience of operation, I movably or pivotally mount the said cell upon the camera at the position indicated so that it may be temporarily displaced from its functioning position in order that the user of the camera may have an unobstructed view of the image upon the ground glass. My invention, however, is not limited to movably or pivotally mounting the cell. A sheet metal support 6 is hinged at 7 on a transversely extending rod or pin, so that it can be put in a horizontal or vertical position. When the reading is being made, the said rod carrying the photo-electric cell 6 is moved into the position shown in section, Fig. 1, by a lever 8, shown most clearly in Fig. 3. After reading has been made, the cell is moved out of functioning position to the inactive position shown in dotted lines in Fig. 1 by lever 8, shown in corresponding dotted lines in Fig. 3. In Fig. 2, the top elevation of the camera is sectioned. This view shows the photo cell 6 in position on the ground glass for a reading. It also shows wires connecting the photo-cell 6 and a meter to form a circuit. For this purpose, wire 9, shown most clearly in Fig. 2, connects one side of the meter to an insulating member 10, then to a flexible lead 11 to the cell 5, Fig. 1. The wire 12 is connected to the shaft 7, which forms the hinge element together with member 14 for supporting the photo-cell unit. Said shaft 7 also carries one side of the circuit through wire 15 to the meter. It will be seen that for taking a reading it is merely necessary to press the lever 8 downward, viewing Fig. 3, as far as it will go. This places the photo-electric cell 5 on the ground glass 4, so that it is in position then to be acted on by any light coming through the lens assembly 16, Fig. 1, and reflected by mirror 4, in said figure.

It can readily be seen that if the cell 5 is connected to a sensitive meter through leads 9, 10, 11, 12, the shaft 13 and wire 15, the current flowing through these wires and through the meter will cause a movement in the meter pointer which can be interpreted into a reading that will be the shutter speed to be used for that particular light condition. It will also be seen that if the area of opening 17 of the lens assembly is changed, it will also change the amount of light reflected from mirror 4 to ground glass 4a. This change will have a similar effect on the amount of current flowing through the circuit hereinbefore referred to. The result will be to cause a change in the reading of the meter shown in Fig. 8.

As it would be exceedingly difficult to build a meter that would have sufficient range to cover all the conditions of light variations, it is highly desirable to provide a meter with two different calibrations; that is, a meter with resistance in the circuit which will take care of the higher levels of illumination and, by short circuiting this resistance, render it possible to get indications on the lower light levels.

As hereinbefore set forth, it is very essential that this device be simple to operate and with very little additional mental or physical effort on the part of the operator. A new type of meter control means constitutes an important part of the invention. Such meter and control means is shown in cross section, Fig. 6, and in perspective in Fig. 7. A further sectional view in Fig. 8 and a perspective view in Fig. 9 show a different setting of dials of the same meter. It also becomes necessary, in an instrument intended to accomplish the objects herein set forth, that it be possible to adjust or compensate for the different types or speeds of sensitized material. This has been done by my invention, and the means for accomplishing the same will be set forth in detail.

In Figs. 4 to 9 inclusive, I have represented the construction of the special meter unit. It is unnecessary to describe in detail the actual meter itself, namely, the component parts of a galvanometer or volt meter, whichever may be used, as the same is an instrument that may be purchased in the open market. In order to obtain the required results, it is necessary, however, to use such a meter in or with a specially constructed case or receiver. The structure employed is preferably the following, constituting an important part of my invention.

Figure 6:
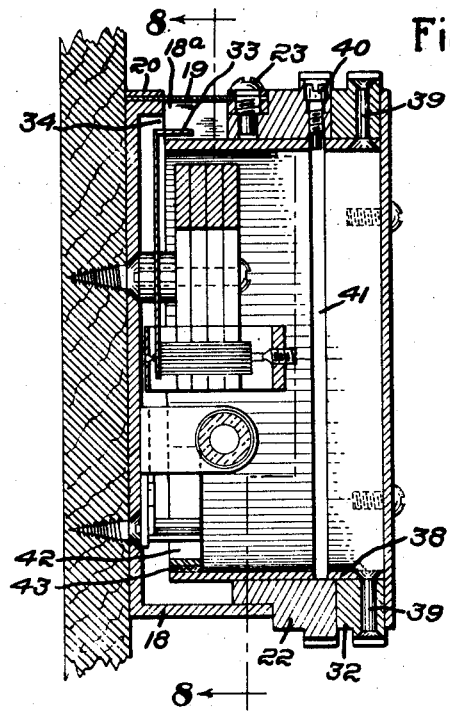
Fig. 6 is a vertical section on the line 6—6 of Fig. 7.
Figure 7:
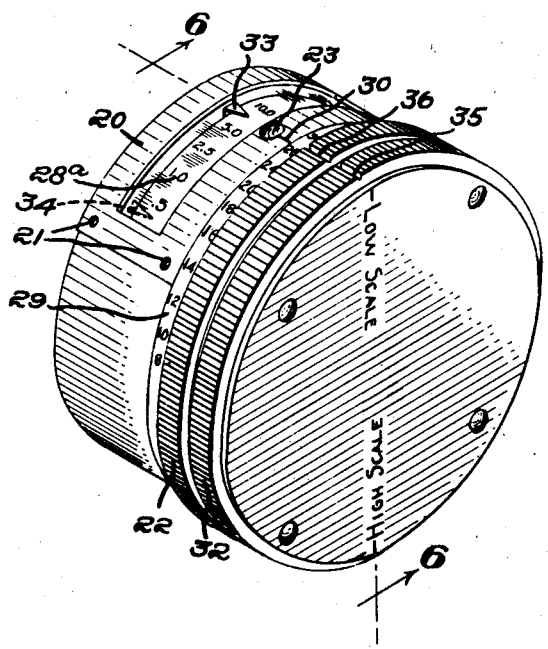
Fig. 7 is a perspective view showing the meter unit set for reading the low scale.

Referring first to Figs. 6 and 7, a cylindrical cup-shaped structure 18 is provided, having an opening 18a at the top or upper surface, through which the meter can be read. Said opening is covered with a piece of celluloid or other suitable material 19 and an escutcheon plate 20 held in place by screws 21, best shown in Fig. 7. Into the outer end of the cylindrical member 18 is fitted a ring 22 held in place by screws 23, 24, 25, the screw 23 appearing in Fig. 6, and the screws 24 and 25 appearing in Fig. 8. The said screws 24, 25 are received in slots 26 and 27, as there clearly shown. In Fig. 6, the screw 23 is shown as received in a similar slot. The said screws 23, 24, 25 retain the ring 22 and prevent its removal from the cylindrical casing 18, but allow it to be turned or rotated sufficiently to displace the scale 28 shown in Fig. 9 (that is, the high scale for the high light levels or values) a sufficient distance to allow any part of the scale 29 of Figs. 7 and 9 to be aligned with the index mark 30 appearing in Figs. 7 and 9.

A ring 32 is also provided in front of the ring 22, as shown most clearly in Figs. 6, 7 and 9, the said ring 32 being connected to an inner cylinder hereinafter described. When moving the ring 22 the ring 32 also moves with it unless ring 22 is held stationary while ring 32 is being moved. The purpose of this construction will be set forth later.

It will be observed that inasmuch as the scale 28 moves with the scale 29, any movement of the ring 22 also displaces scale 28. This is necessary in order to compensate for the various speeds of action of sensitized material. What actually occurs is the change of relation of scale 28 with regard to the pointer 33 shown in Figs. 7 and 9.

For example, if the scale 29, which is on ring 22 in Fig. 9, be moved to coincide with the sensitized material indicated by the numeral 20 of scale 29, the pointer 33 would then read approximately 1/200 sec. instead of 1/750 sec., as it now does in Fig. 9. On the other hand, if the ring 22 carrying scale 29 were moved and the numeral 26 on said scale 29 were displaced so that it coincided with the index 30, the scale 28 would also be displaced, with the consequence that the exposure reading would then be approximately 1/750 sec.

It will thus be seen that the structure or arrangement of parts gives the user an opportunity to select the scale that corresponds to the sensitized material used. The scale 29 is used for this purpose and is calibrated in this particular instance with the Sheiner reading, which is one of several scales that may be used for this purpose. It is to be understood, however, that any other suitable scale may be used, such, for example, as the H. & D., or the Wynne, in which case the scale 29 would be calibrated accordingly.

It is a known fact that no photo-cell and single range instrument can cover the entire field of light values to be measured. Therefore, it becomes necessary to have some method by which the sensitivity of the meters can be changed. In other words, when dealing with brilliant illumination, it is highly desirable that the meter be less sensitive than when dealing with very poor illumination. In the latter case, the meter must be very sensitive. Also it will be readily understood that if two different sensitivities are employed, or indicated in or by the meter, it will also be necessary to provide two different scales for reading the meter, inasmuch as the meter must be a direct reading, namely, in terms of the shutter speed. For example, if the less sensitive reading is being used, the meter might indicate a speed of say, 1/500 set., but when using the more sensitive meter the scale might read 7½ sec., although the meter hand or indicator would be in the same position.

Such a provision or capacity as just set forth is necessary because of the fact that the device herein disclosed gives a direct reading of the light that passes through the lens assembly 16 and reflected from the mirror 4 to the ground glass 4a or, when the mirror 4 is displaced, through the lens assembly 16 to the sensitized material itself which may be either a film, a plate, or a film pack.

As the lens opening 17 is stopped down or its area reduced, less light passes through and this necessitates making some adjustment with respect to the shutter speed. With the present invention, however, no other calculations for the diaphragm opening or the amount of light allowed to pass through the lens assembly need be made. The user merely sets the ring 32 on the meter case 18 to the high scale position as indicated in Fig. 9, then points the camera at the object to be photographed, then focuses on the ground glass in the usual manner, then turns or moves downward into position the photo-cell 6 by the use of the lever 8, as indicated in full lines in Fig. 3, and takes the reading on the scale 28, Fig. 9, which will be the direct shutter speed. If now the user finds that he has to stop the lens down to any great extent in order to obtain depth of focus, he might not get on the meter any indication at all (or at the most a very low one) that is a displacement of the indicator 33. This will, of course, indicate that the energy is much lower than required to operate the meter at such setting.

The normal position of indicator 33, when no current is flowing, is that shown in dotted lines at 34 in Fig. 7. The user then turns the ring 32, holding stationary the ring 22, until the index mark 35 of Fig. 7 coincides with the index mark 36 on ring 22 (see Fig. 7).

Figure 8:
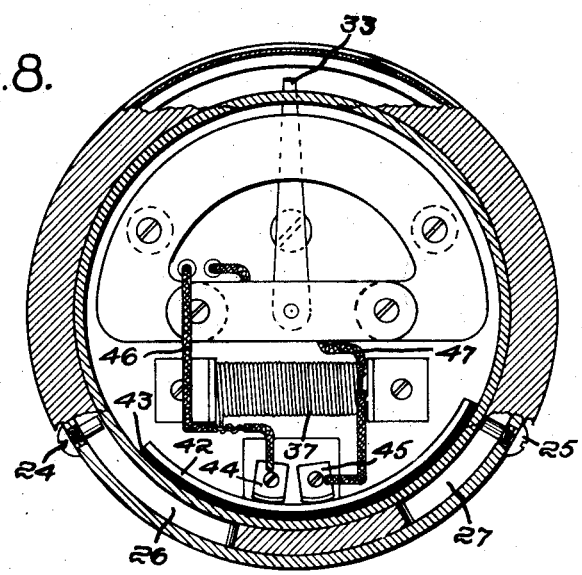
Fig. 8 is a transverse section of Fig. 6 on the line 8—8; and—
Figure 9:
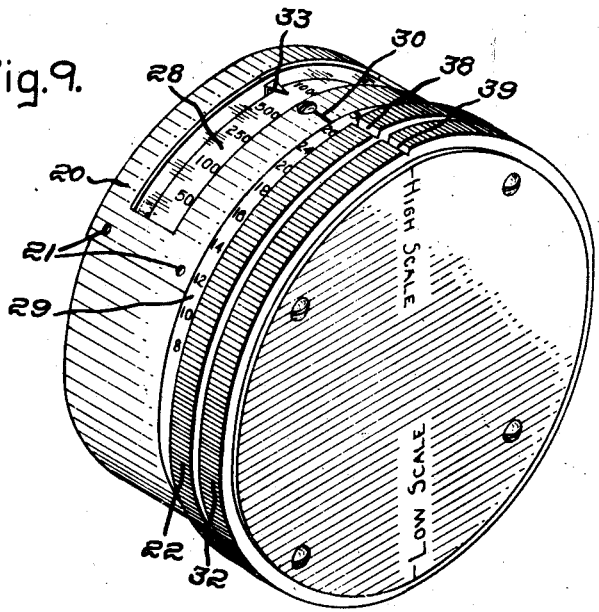
Fig. 9 is a perspective view of the meter showing the setting for the high scale.

This will short circuit the resistance 37 shown in Fig. 8, causing the meter to be much more sensitive. It will then be possible to get a reading on scale 28a of Fig. 7, which scale has been brought into position by turning the disk or ring 32. The said scale 28a is graduated with correspondingly longer exposures to compensate for the change in light due to stopping down and the change in the sensitivity of the meter is brought about by short circuiting the resistance.

As shown most clearly in Fig. 6, the ring 32 has attached thereto a cylinder 38 by a number of through rivets 39 which compel the cylinder 38 and ring 32 to turn in unison. The said cylinder 38 is held in place by a screw 40 shown most clearly in Fig. 6 as fitting in a slot 41 provided circumferentially in said cylinder. The construction is such as to allow the cylinder 38 and the ring 32 to be turned in unison 180 degrees in relation to the ring 22.

On the cylinder 38 is a metal strip 42 serving as a conductor. The said metal strip 42, while being made to travel with the cylinder 38, is nevertheless insulated electrically therefrom by reason of an insulator 43, as shown most clearly in Fig. 8.

It will be apparent from Fig. 8 that the contacts 44 and 45 which connect with leads 46 and 47 respectively, from the moving coil of the instrument, have the resistance 37 shunted across them. When the contacts 44 and 45 are open, the circuit is established, as shown in Fig. 4. In such case, the current flows from the photo-cell 5 through the resistance 37, through the meter hereinbefore referred to, and back to the photo-cell, causing a change in the position of the indicator hand 33 if the current be strong enough to operate said indicator hand.

If the contacts 44 and 45 are short circuited by the contact plate 42, the current then flows from the photo-cell 5 in Fig. 4 through the contact 44 and plate 42 and contact 45, and thence to the meter back to the photo-cell. Such action or functioning is indicated in Figs. 5 and 8. The same is, however, a much lower resistance circuit, and therefore will require considerably less E. M. F. to operate the meter. Plate 42 is made long enough to allow the ring 32 to turn with the ring 22 when making a change in the scale 28 or 28a to correspond to any setting on scale 29, and at the same time make a contact with contact fingers 44 and 45, when using scale 28a only.

It will be understood that rings 22 and 32 are always turned together, excepting when making a change from high to low reading or the reverse.

I am aware that it is broadly old to use a resistance in series with the meter and to shunt out the said resistance in order to change the reading of the meter. So far as I am aware, however, it is new both as to method and apparatus to cause such change to take place in connection with the movement of certain scales so as to give a direct reading without the necessity of reference to any other instruments, scales, tables, etc.

It will be understood from the foregoing description that by the method herein disclosed and by the apparatus or mechanism described and shown, there is provided a new and fast manner of photography. Because of the fact that the reflex type of structure provides for very accurate focusing, the desired result in the taking of pictures is easy of accomplishment and means for ascertaining the correct depth of focus is provided. In addition, means are thus provided for determining very accurately and definitely the correct exposure without in any way adding complications or requiring devices which are difficult to use.

Having thus described one illustrative embodiment of my invention and the best mode known to me for practicing the same, it is to be understood that although specific terms are employed, they are used in a generic and descriptive sense and not for purposes of limitation, the scope of the invention being set forth in the following claims.

I claim:

1. A camera provided with a lens, means for stopping down the same, a shutter, a mirror and a focusing screen, all in operative relation, a photo-electric cell connected to the camera and mounted thereon above the focusing screen thereof, said photo-cell being of markedly less area than that of the focusing screen, so that, with said cell in functioning position against the screen, the image may nevertheless be effectively studied on the said screen outside the contour of the cell, the construction of the camera and said parts thereof being such that the light to be measured by said cell passes in an uninterrupted beam through the lens and is reflected by the mirror through the focusing screen while the image is focused thereon so as to be measured as an uninterrupted beam at the focusing screen, and an electric meter carried by the camera and electrically connected to the said photo-cell and having indications for the use of sensitized material of varying speeds, whereby the shutter speed may be definitely determined at the time of focusing according to the speed of the sensitized material.

2. A camera provided with a lens, means for stopping down the same, a shutter, a mirror, and a focusing screen, all in operative relation, a photo-electric cell connected to the camera and mounted thereon above the focusing screen thereof, said photo-cell being of markedly less area than that of the focusing screen, so that, with said cell in functioning position against the screen, the image may nevertheless be effectively studied on the said screen outside the contour of the cell, the construction of the camera and said parts thereof being such that the light to be measured by said cell passes in an uninterrupted beam through the lens and is reflected by the mirror through the focusing screen while the image is focused thereon so as to be measured as an uninterrupted beam at the focusing screen, and an electric meter carried by the camera and electrically connected to the photo-cell, said meter having indications for two different sensitivities whereby the shutter speed may be definitely determined at the time of focusing and whereby corrections are indicated relative to the speed of sensitized material used.

3. A camera provided with a lens, means for stopping down the same, a shutter, a mirror and a focusing screen, all in operative relation; a photo-electric cell connected to the camera, a rod constituting a pivot for the cell and whereon said cell is mounted above and in proximity to the focusing screen thereof, the said rod having operating means therefor structurally connected thereto; the construction being such that the light to be measured by said cell passes through the focusing screen while the image is focused thereon, and an electric meter carried by the camera and electrically connected to the said photo-cell, so that the shutter speed may be definitely determined at the time of focusing and up to the time of exposure.

4. A camera provided with a lens, means for stopping down the same, a shutter, a mirror and a focusing screen, all in operative relation; a photo-electric cell connected to the camera, a rod constituting a pivot for said cell, said rod extending to the outside of the camera casing, so that it may be operated manually, the construction being such that the said cell is mounted on said rod above and in close proximity to the focusing screen, so that the light to be measured by said cell passes through the focusing screen while the image is focused thereon, and an electric meter carried by the camera and electrically connected to said photo-cell, whereby the shutter speed may be definitely determined at the time of focusing.

5. A camera provided with a lens, means for stopping down the same, a shutter, a mirror and a focusing screen, all in operative relation; a photo-electric cell connected to the camera, a shaft on which the said cell is mounted as a pivot, said shaft extending to the outside of the camera casing and an operating lever fast on said shaft outside the casing, the construction and relative location of parts being such that the said photo-cell is mounted on said shaft above and in proximity to the focusing screen, whereby the light to be measured by said cell passes through the focusing screen while the image is focused thereon, and an electric meter carried by the camera and electrically connected to the said photo-cell, so that the shutter speed may be definitely determined at the time of focusing.

6. A camera provided with a lens, means for stopping down the same, a shutter, a mirror and a focusing screen, all in operative relation; a photo-electric cell mounted on and structurally connected to the camera above and in proximity to and so as to have functioning position against the focusing screen, so that the light to be measured by said cell passes through the focusing screen while the image is focused thereon, said photo-cell being of markedly less area than that of the focusing screen, so that, with said cell in functioning position against the screen, the image may neverthelesss be effectively studied on the said screen outside the contour of the cell; and an electric meter carried by the camera and electrically connected to said photo-cell, whereby the shutter speed may be definitely determined at the time of focusing.

7. A camera provided with a lens, means for stopping down the same, a shutter, a mirror and a focusing screen, all in operative relation; a photo-electric cell structurally connected to and mounted on the camera above the focusing screen thereof, the construction being such that the light to be measured by said cell passes through the focusing screen while the image is focused thereon; and an electric meter carried by the camera and electrically connected to said photo-cell, the said meter being attached to the outside of an outer side wall of the camera casing, which wall is held in upright position by the operator when viewing the focusing screen, whereby said meter may be read by the operator with the casing in focusing position without necessary change of the position of the camera.

8. A camera provided with a lens, means for stopping down the same, a shutter, a mirror and a focusing screen, all in operative relation; a photo-electric cell connected to the camera, a rod mounted on the camera and extending through an outer wall thereof and there provided with operating means, said rod constituting a pivot for the said cell and whereon the said cell is mounted above and in proximity to the focusing screen, the construction being such that the light to be measured by said cell passes through the focusing screen while the image is focused thereon; and an electric meter mounted on said outer wall of the camera casing through which the said rod extends and in proximity to the operating means on said rod.

9. A camera provided with a lens, means for stopping down the same, a shutter, a mirror and a focusing screen, all in operative relation; a photo-electric cell movably but structurally mounted thereon above the focusing screen thereof, so that it may be shifted into and out of functioning position with relation to the screen, said photo-cell being of markedly less area than that of the focusing screen, so that, with said cell in functioning position against the screen, the image may nevertheless be effectively studied on the said screen outside the contour of the cell the construction of the camera and said parts being such that the light to be measured by said cell passes in an uninterrupted beam through the lens and in said uninterrupted condition is diffused on the focusing screen; and an electric meter carried by the camera and electrically connected to the said photo-cell.

10. A camera provided with a lens, means for stopping down the same, a shutter, a mirror, a focusing screen and a hood adapted to be used in focusing; a photo-electric cell structurally connected to and mounted on the camera casing for movement into and out of functioning position, the mounting means of said cell being separate and distinct from the said hood, said photo-cell being of markedly less area than that of the focusing screen, so that, with said cell in functioning position against the screen, the image may nevertheless be effectively studied on the said screen outside the contour of the cell the construction being such that the light to be measured by said cell passes through the focusing screen while the image is focused thereon; and an electric meter carried by the camera and electrically connected to the said photo-cell.

11. A camera provided with a lens, means for stopping down the same, a shutter, a mirror and a focusing screen, all in operative relation; a photo-electric cell connected to the camera, a pivotal rod mounted on the camera and constituting the connection of said photo-cell to the camera and by which the said cell is mounted above the focusing screen for movement into and out of functioning position thereagainst, the construction of the camera and said parts being such that the light to be measured by said cell passes through the focusing screen while the image is focused thereon, and an electric meter carried by the camera and electrically connected to said photo-cell, said pivotal rod for the cell serving also as a part of the electrical connection between said cell and said meter.

12. A camera provided with a lens, means for stopping down the same, a shutter, a mirror and a focusing screen, all in operative relation; a photo-electric cell connected to the camera above the focusing screen thereof, the said photo-cell being mounted upon the camera casing in such way as to be movable into and out of its functioning position against the screen, the construction of the camera and the said parts being such that the light to be measured by said cell passes through the focusing screen while the image is focused thereon; and an electric meter carried by the outside of an outer side wall of the camera casing and electrically connected to the said photo-cell; the electrical wiring connections between the said cell and the said meter being such as to permit such movements of the said photo-cell into and out of functioning position.

13. A camera provided with a lens, means for stopping down the same, a shutter, a mirror, a focusing screen, a focusing hood, a photo-electric cell, a rod mounted on the camera and whereon said cell is pivotally mounted above the focusing screen for swinging movement into and out of functioning position, the said rod being spaced substantially inward from the hood wall so as to be independent in operation of the said hood, the construction of parts being such that the light to be measured by said cell passes through the focusing screen while the image is focused thereon; and an electric meter carried by the camera and electrically connected to the said photo-cell.

14. A camera provided with a lens, means for stopping down the same, a shutter, a mirror and a focusing screen, all in operative relation, a photo-electric cell structurally connected to the camera and mounted thereon above the focusing screen thereof, said photo-cell being of markedly less area than that of the focusing screen, so that, with said cell in functioning position against the screen, the image may nevertheless be effectively studied on the said screen outside the contour of the cell, the construction of the camera and said parts being such that the light to be measured by said cell passes in an uninterrupted beam through said lens and through the focusing screen while the image is focused thereon, and an electric meter carried by the camera and electrically connected to the said photo-cell, said meter having indications for two different sensitivities, whereby the shutter speed may be definitely determined at the time of focusing and up to the time of exposure.

15. A camera provided with a lens, means for stopping down the same, a shutter, a mirror and a focusing screen, all in operative relation; a photo-electric cell structurally connected to the camera and mounted thereon above the focusing screen thereof, said photo-cell being of markedly less area than that of the focusing screen, so that, with said cell in functioning position against the screen, the image may nevertheless be effectively studied on the said screen outside the contour of the cell, the construction of the camera and of said parts being such that the light to be measured by said cell passes in an uninterrupted beam through said lens and through the focusing screen while the image is focused thereon, and an electric meter carried by the camera and electrically connected to the said photo-cell, and means for changing the sensitivity of the meter including two different scales reading in terms of shutter speed, whereby the shutter speed may be definitely determined at the time of focusing.

16. A camera provided with a lens, means for stopping down the same, a shutter, a mirror, a focusing screen and a hood adapted to be used in focusing; a photo-electric cell structurally connected to the camera wall within the confines of the hood and mounted on the camera casing above the focusing screen so as to be used thereagainst in measuring the light passing through said screen, the said structural connection for said cell being distinct from the hood so as not to interfere with the operation of the hood, the construction of the camera and of said parts being such that the light to be measured by said cell passes through the focusing screen while the image is focused thereon; and an electric meter carried by the camera and electrically connected to the said photo-cell.

EDSON S. HINELINE.